United States Patent [19]
McKay

[11] Patent Number: 5,662,391
[45] Date of Patent: Sep. 2, 1997

[54] PNEUMATIC EMPTY/LOAD PROPORTIONING FOR ELECTRO-PNEUMATIC BRAKE

[75] Inventor: Albert A. McKay, Stoney Creek, Canada

[73] Assignee: Westinghouse Air Brake Company, Wilmerding, Pa.

[21] Appl. No.: 585,629

[22] Filed: Jan. 16, 1996

[51] Int. Cl.$^6$ ........................................... B60T 8/18
[52] U.S. Cl. ........................... 303/22.4; 303/22.2
[58] Field of Search ................... 303/22.2, 22.1, 303/22.4, 22.6, 22.7, 22.8, 3, 15, 20

[56] References Cited

U.S. PATENT DOCUMENTS

| | | | |
|---|---|---|---|
| 4,145,089 | 3/1979 | Reinecke et al. | 303/22.4 |
| 4,682,823 | 7/1987 | Hommen et al. | 303/22.4 |
| 5,497,098 | 3/1996 | Brearley | 303/22.2 |

*Primary Examiner*—Matthew C. Graham
*Attorney, Agent, or Firm*—Gary J. Falce

[57] ABSTRACT

A microprocessor based electro-pneumatic brake system for a railroad car including an emergency backup having load control apparatus under control of the microprocessor and arranged to maintain a load setting consistent with the microprocessor control in the event a power failure or malfunction renders the microprocessor inoperable.

6 Claims, 2 Drawing Sheets

PNEUMATIC EMPTY/LOAD PROPORTIONING FOR ELECTRO-PNEUMATIC BRAKE

BACKGROUND OF THE INVENTION

The present invention is related to microprocessor based electro-pneumatic brake systems for railroad freight cars having a pneumatic emergency backup brake with a load control function provided by the microprocessor.

In electro-pneumatic brake systems, a pneumatic emergency backup brake is desirable from the standpoint of bringing the train to a safe stop in the event of a power failure. A double check valve device may be employed to separate the two brake control systems such that the system producing the higher pressure prevails in controlling the car brakes. In such an arrangement, the pneumatic emergency brake becomes effective in response to a reduction of brake pipe pressure, such as in the case of a train break-in-two, for example. This is typically accomplished by having the solenoid valves in the electro-pneumatic brake system configured to release the electro-pneumatically controlled brake cylinder pressure in a deenergized condition.

It is desirable in a microprocessor based electro-pneumatic brake system to utilize the microprocessor to monitor the car load condition and regulate the brakes accordingly. It is also desirable to regulate the pneumatic emergency backup brake according to the load condition of the car. Such load control of the railroad freight car brakes protects the car wheels from damage due to wheel slide.

It will be appreciated that where the pneumatic emergency backup brake employs a load control function under control of the microprocessor, such a power failure, as would occur in the case of a train break-in-two or such as would be caused by a microprocessor malfunction, renders the car load control ineffective to properly regulate the emergency backup brake. Consequently, light or empty cars in a train could be overbraked during emergency backup brake operation, causing wheel slide and the aforementioned wheel damage that results from such condition.

SUMMARY OF THE INVENTION

It is the object of the present invention to provide a microprocessor controlled empty/load brake function for a pneumatic emergency backup of an electro-pneumatic brake such that the pneumatic emergency backup empty/load control remains intact in the event microprocessor control is lost due to a power failure or malfunction, for example.

Briefly, in carrying out this objective, there is provided a railroad car brake system including a primary brake portion having a microprocessor controller, a backup brake portion having an emergency valve controller, fluid pressure operated brake means, and a double check valve device via which one of said microprocessor controller and said emergency valve controller is effective to operate said brake means, wherein the improvement comprises valve means having an activated condition for limiting the fluid pressure effective at said double check valve device when said emergency valve controller is operated, said microprocessor controller outputting a first control signal in accordance with an empty condition of said railroad car, and empty/load selector valve means operable to a first position in response to said first control signal for establishing said activated condition of said valve means, said empty/load selector valve means being stable in said first position in the absence of said first signal.

This and other objects and attendant advantages of the present invention will become more apparent from the following more detailed explanation when taken in conjunction with the accompanying drawings in which:

DESCRIPTION AND OPERATION

Figure 1:
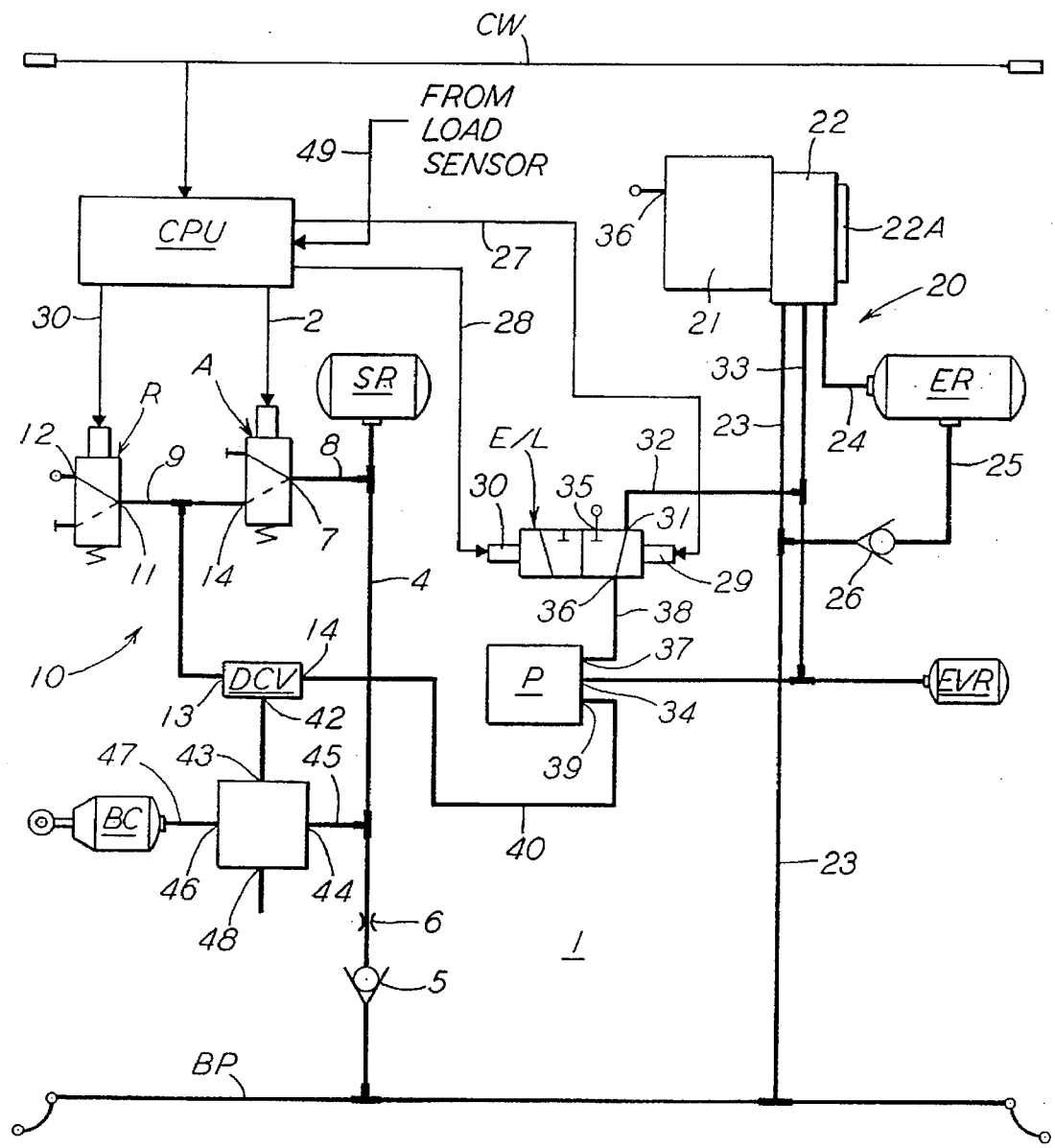
FIG. 1 is a diagrammatic view of a railroad car brake system in accordance with the present invention.

Referring to FIG. 1 of the drawings, there is provided a railroad freight car brake system (1) including a primary electro-pneumatic brake control (10), a pneumatic backup brake control (20), a brake cylinder device BC, a relay valve RV, a double check valve DCV that separates the respective electro-pneumatic and pneumatic backup brake controls, a control wire CW or alternatively a receiver for a radio communication link, and a brake pipe BP.

Electro-pneumatic brake control (10) comprises a microprocessor CPU to which control wire CW is connected, application and release, solenoid-operated, spring-returned, electro-pneumatic valves A and R that are controlled by microprocessor CPU via wires (2) and (3), and a supply air reservoir SR that is connected to brake pipe BP via a branch pipe (4) having a one-way check valve (5) and a choke (6). An inlet (7) of application valve A is connected to branch pipe (4) by a pipe (8), and a pipe (9) connects the active outlet (10) of application valve A to the inlet (11) of release valve R. The active outlet (12) of release valve R is vented to atmosphere. Pipe (9) is connected to one inlet port (13) of double check valve device DCV.

Pneumatic backup brake control (20) comprises an emergency portion (21) of a conventional, well-known, AB type freight brake control valve device, such as the industry standard ABD and ABDX type, for example, a bistable, two-position solenoid-operated, three-way electro-pneumatic empty/load control valve E/L, a proportioning valve P, an equalizing volume reservoir EVR, and an emergency reservoir ER. Emergency portion (21) may be mounted on a standard AB type pipe bracket (22) to which brake pipe BP is connected via a branch pipe (23). Emergency reservoir ER is connected to pipe bracket (22) via a pipe (24) and to branch pipe (23) via a pipe (25) having a one-way check valve (26). In that no service portion is employed with pipe bracket (22), the pipe bracket exhaust port and auxiliary reservoir port are blanked. Also, a blanking plate (22A) is affixed to the pipe bracket face on which the absent service portion is normally mounted. In the absence of a service portion via which the exhaust of brake cylinder pressure may be obtained, emergency portion (21) may be provided with an exhaust port (36) in accordance with the teachings of commonly-assigned, co-pending application, Ser. No. 08/448,144, Docket No. 8813-N incorporated herein by reference.

In addition to wires (2) and (3), microprocessor CPU further includes wires (27) and (28) that are connected to the respective empty and load solenoid operators (29) and (30) of load Control valve E/L. An inlet (31) of load control valve E/L is connected by a pipe (32) to a delivery pipe (33) that extends from pipe bracket (22) to the supply port (34) of proportioning valve P and to an equalizing volume reservoir EVR. Outlet (35) of load control valve E/L is vented to atmosphere, while outlet (36) is connected to a pilot port (37) of proportioning valve P via a pipe (38). The proportioning valve delivery port (39) is connected via a pipe (40) to the other inlet (41) of double check valve device DCV.

Relay valve RV is a conventional type relay having a control chamber to which the outlet port (42) of double check valve DCV is connected via an inlet port (43); a supply port (44) to which supply reservoir SR is connected via branch pipe (4) and a pipe (45); a delivery port (46) to which brake cylinder BC is connected via pipe (47); and an exhaust port (48).

Finally, microprocessor CPU receives a load control signal via a wire (49), which, for example, may be connected to an electronic circuit (not shown) for monitoring the position of a sensor arm associated with a mechanical load sensor valve that operates between the railroad car body and truck in order to detect the truck spring deflection as a measure of the car load condition.

Figure 2:
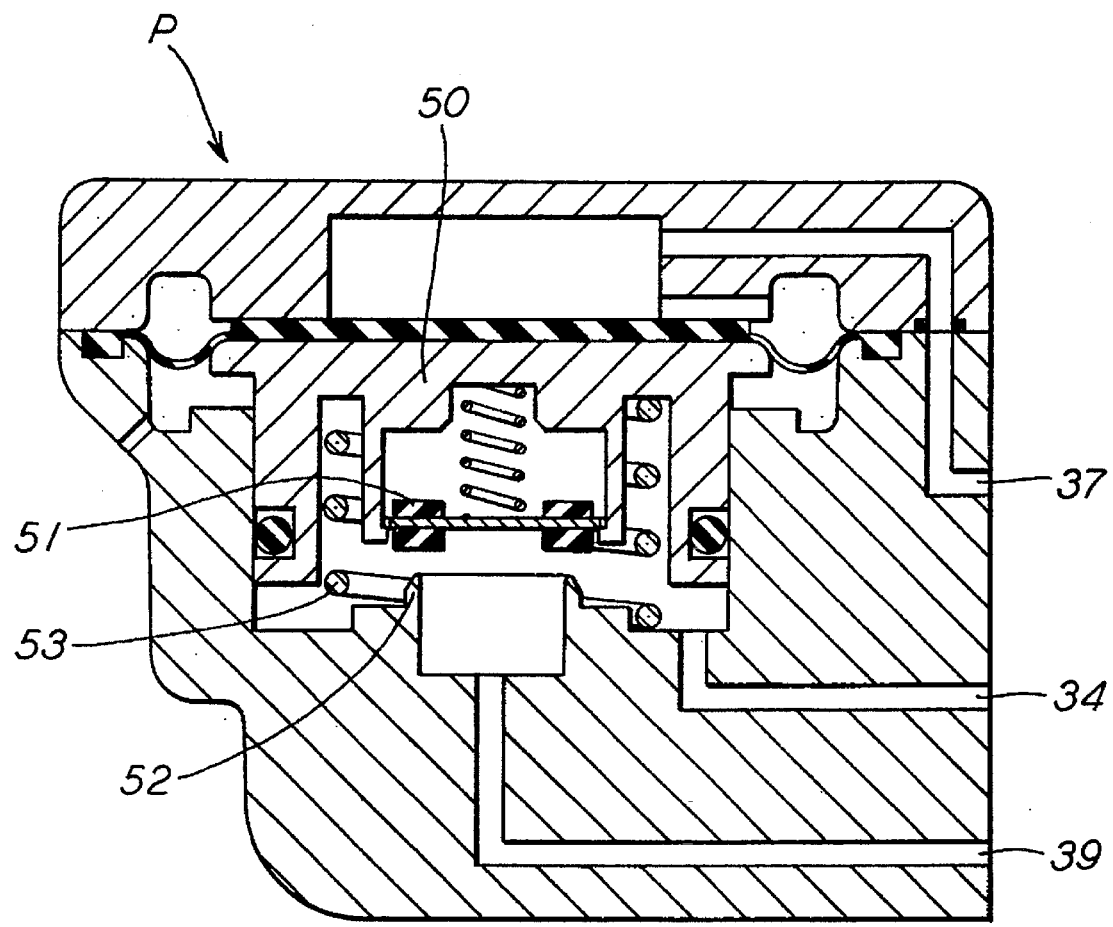
FIG. 2 is a sectional view of a proportioning valve employed in the brake system of FIG. 1.

Referring now to FIG. 2 of the drawings, proportioning valve P is shown in detail, being essentially the same as the "P-1 Load Proportioning Valve" manufactured by the Westinghouse Air Brake Company for the industry standard SC-1 Empty and Load Freight Brake Equipment and also disclosed in U.S. Pat. No. 3,671,086 incorporated herein by reference.

Briefly, proportioning valve P comprises a differential area piston (50) that is subject on one side to the pressure effective at pilot port (37) and on the opposite side to the pressure effective at supply port (34). Piston (50) carries a disc valve element (51) that is cooperatively arranged to engage and disengage an annular valve seat (52) in accordance with the position of piston (20). A return spring (53) acts on piston (50) to bias the piston in its upper-most position in which valve element (51) is unseated.

When brake pipe BP is charged to its operating pressure, control wire CW issues a brake release signal to microprocessor CPU, which deenergizes the solenoid operators of application valve A and release valve R. In their deenergized condition, as shown, application valve A is set in a normally closed position by its return spring and release valve R is set in a normally open position by its return spring. The control chamber of relay valve RV is thus vented via control port (30), ports (29), (13) of the double check valve DCV, and outlet (12) of release valve R. Relay valve RV thus assumes its release position in which brake cylinder BC is vented via pipe (33) and exhaust port (35).

Concurrently, the charged brake pipe BP supplies air to supply reservoir SR via check valve (5), choke (6) and branch pipe (4); to emergency reservoir ER via branch pipe and passage (23), check valve (26) and pipe (25); and from branch pipe and passage (23) to pipe bracket (22). As will hereinafter be explained, an increase in brake pipe pressure causes emergency portion (21) to assume its release condition in which the other inlet port (41) of double check valve DCV is vented via pipe (40), proportioning valve P, pipe (33), and exhaust port (36) provided in emergency portion (21).

Consequently, the car brakes are released and the car brake system (1) is charged preparatory to a subsequent service brake application via the electro-pneumatic brake control (10) or via the backup emergency brake control (20) in the event of a break-in-two or an emergency brake application, as will now be explained.

When a service brake application is desired, the electro-pneumatic brake control (10) is operated by a brake command signal transmitted to microprocessor CPU via control wire CW. Microprocessor CPU in turn, energizes the solenoid operators of application valve A and release valve R via wire (2) and wire (3) causing application valve A to open and release valve R to close. This results in double check valve inlet port (13) being cut off from atmosphere at release valve R and concurrently connected to supply reservoir SR via the connected ports (7), (14) of open application valve A, and pipe (8). The relay valve control port (43) is thus pressurized via outlet port (42) of double check valve DCV, causing relay valve RV to, in turn, connect compressed air from supply reservoir SR to brake cylinder BC via pipes (4), (45), relay valve ports (44), (46) and pipe (47) at a pressure corresponding to the pressure at control port (43).

When the brake cylinder pressure matches the pressure called for by the brake command signal transmitted via wire CW and adjusted according to the car load condition, as monitored by microprocessor CPU, the solenoid operator of application valve A is deenergized. Application valve A is thus spring returned to its normally closed position in which further supply of pressure from supply reservoir SR to brake cylinder BC is interrupted.

Brake cylinder pressure under electro-pneumatic brake control may be increased in accordance with an increased brake command signal, as above-explained, or may be released in accordance with the charging of the brake system, as explained. During this time, brake pipe pressure is maintained at the desired operating pressure and consequently emergency portion (21) of pneumatic backup brake system (20) is held in abeyance, it being understood that emergency portion (21) is only responsive to emergency rates of reduction of brake pipe pressure, in accordance with the well-known operation of AB type control valve emergency portions.

It will also be understood that during such electro-pneumatic brake control, microprocessor CPU outputs either an empty signal via wire (29) or a load signal via wire (30) depending upon the car load condition, as indicated by the load signal input to microprocessor CPU via wire (49).

In the case of an empty car load condition, solenoid (29) is energized to position empty/load valve E/L to connect inlet (31) to outlet (36), as shown. Being bistable, empty/load valve E/L remains set in this position following deenergization of wire (27) until wire (28) is energized. Consequently, a loss of power such as to cause microprocessor CPU to fail or a train break-in-two will cause deenergization of solenoid (29), but will not change the set position of empty/load valve E/L.

When an emergency backup brake application is called for by an emergency rate of reduction of brake pipe pressure either under control of the locomotive engineer or as a result of a train break-in-two, for example, emergency portion 21 operates to connect compressed air in emergency reservoir ER to pipe 33 in a well-known manner. Air pipe (33) is connected to supply port (34) of proportional valve P and is concurrently connected to the proportional valve pilot port (37) via pipe (32), inlet (31) and outlet (36) of empty/load valve E/P, and pipe (38). As can be seen in FIG. 2, the air at pilot port (37) and supply port (34) acts on opposite sides of differential area piston (50), which is normally positioned by bias spring (53) to unseat valve element (51). Supply port air is thus connected past open valve (51), (52) to delivery port (39) and thence via pipe (40) and inlet (41) and outlet (42) of double check valve DCV to control port (43) of relay valve RV. When the pressure of this air is a predetermined percentage of the supply port pressure in accordance with the differential area of piston (50), less the value of spring (53), the piston will seat valve element (51) and thereby limit the pressure effective at relay valve control port (43). In this manner, the brake cylinder pressure delivered by relay valve RV from supply reservoir SR is accordingly limited in accordance with an empty car load condition, irrespective of the fact that microprocessor control of the empty/load valve is absent.

In the event the railroad car is in a load condition, microprocessor CPU causes empty/load valve E/L to assume its other position by energizing solenoid operator (30) via wire (28). In this case, inlet port (31) is blanked and outlet port (36) is vented to atmosphere. Being bistable, empty/load valve E/L remains in this set position in the event of a power loss that causes solenoid operator (30) to be deenergized. Operation of emergency portion (21) in response to an emergency rate of brake pipe pressure reduction thus results in full emergency reservoir pressure being effective at the proportional valve delivery port (39), since only atmospheric pressure is effective at inlet 37 and thus on the upper side of piston (50). The delivery port pressure in turn causes relay valve RV to connect supply reservoir pressure to brake cylinder BC in accordance with the emergency backup brake application on a loaded car.

Equalizing Volume reservoir EVR is provided to obtain an equalization pressure at relay valve control port (43) corresponding to the desired load car condition emergency brake pressure.

I claim:

1. A railroad car brake system including a primary brake portion having a microprocessor controller, a backup brake portion having an emergency valve controller, fluid pressure operated brake means, and a double check valve device via which one of said microprocessor controller and said emergency valve controller is effective to operate said brake means, wherein the improvement comprises:

a) valve means having an activated condition for limiting the fluid pressure effective at said double check valve device when said emergency valve controller is operated;

b) said microprocessor controller outputting a first control signal in accordance with an empty condition of said railroad car; and c) empty/load selector valve means operable to a first position in response to said first control signal for establishing said activated condition of said valve means, said empty/load selector valve means being stable in said first position in the absence of said first control signal.

2. A railroad car brake system as recited in claim 1, wherein said microprocessor controller outputs a second control signal in accordance with a load condition of said railroad car, said empty/load selector valve means being operable to a second position in response to said second control signal for establishing a deactivated condition of said valve means.

3. A railroad car brake system as recited in claim 2, wherein said empty/load selector valve means is stable in said second position in the absence of said second signal.

4. A railroad car brake system as recited in claim 3, wherein said empty/load selector valve means is a two-position, three-way, bistable valve device having a first solenoid operator subject to said first signal for establishing said first position and a second solenoid operator subject to said second signal for establishing said second position.

5. A railroad car brake system as recited in claim 4, further comprising:

a) a source of fluid under pressure;

b) said valve means being a proportioning valve having a supply port to which said source of fluid under pressure is connected when said emergency valve controller is operated, a delivery port to which said brake means is connected, and a pilot port; and c) said empty/load selector valve means connecting said source of fluid under pressure to said pilot port in said activated condition thereof and venting said pilot port in said deactivated condition thereof.

6. A railroad car brake system as recited in claim 5, where said proportioning valve in said activated condition limits the fluid pressure effective at said double check valve device to a predetermined percentage of the fluid pressure effective at said supply port of said proportioning valve.

* * * * *